United States Patent [19]

O'Driscoll

[11] Patent Number: 5,716,072
[45] Date of Patent: Feb. 10, 1998

[54] AIRBAG GAS GENERATOR WITH SNAP JOINT CONNECTION

[75] Inventor: Peter O'Driscoll, Los Altos, Calif.

[73] Assignee: United Technologies Corporation, Hartford, Conn.

[21] Appl. No.: 718,071

[22] Filed: Sep. 17, 1996

[51] Int. Cl.⁶ .................................................. B60R 21/26
[52] U.S. Cl. ........................ 280/740; 280/741; 29/453; 285/921
[58] Field of Search ............................. 280/740, 736, 280/741, 742, 737; 102/531, 530; 285/921; 29/453

[56] References Cited

U.S. PATENT DOCUMENTS

| | | | |
|---|---|---|---|
| 3,817,263 | 6/1974 | Bendler et al. | 280/736 |
| 4,219,161 | 8/1980 | Freissle | 285/921 |
| 4,902,036 | 2/1990 | Zander et al. | 280/736 |
| 5,000,479 | 3/1991 | Werner et al. | 280/736 |
| 5,316,749 | 5/1994 | Schmitt et al. | |
| 5,324,075 | 6/1994 | Sampson | 280/736 |

*Primary Examiner*—Peter C. English
*Attorney, Agent, or Firm*—McAulay Fisher Nissen Goldberg & Kiel, LLP

[57] ABSTRACT

An airbag gas generator has a housing within which a solid gas generating composition is located. The housing has an opening through which a gas formed during fuel combustion exits the housing. A gas distribution cap is fitted to an outlet end of the housing, the cap having a projecting lip at a forward end thereof. The housing has a corresponding recess in the outlet end for accepting the lip therein. The cap further has a plurality of longitudinal slots through which the gas is distributed, the slots defining flexible wall segments which deform during insertion of the cap into the outlet end prior to engagement of the lip with the recess for locking the cap to the housing. Utilizing the present invention, threaded or welded joints are avoided and a light weight, low cost assembly is achieved.

9 Claims, 4 Drawing Sheets

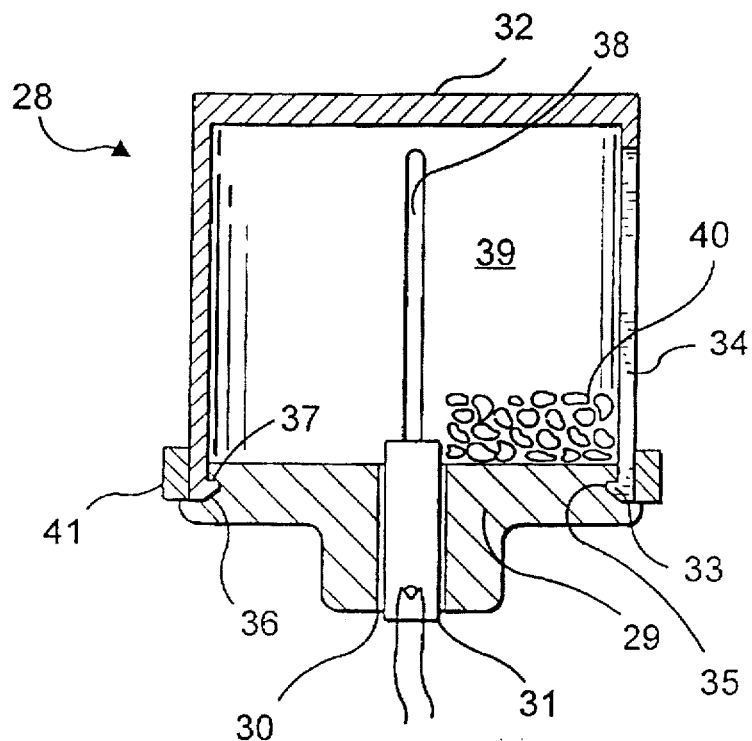
F I G. 4
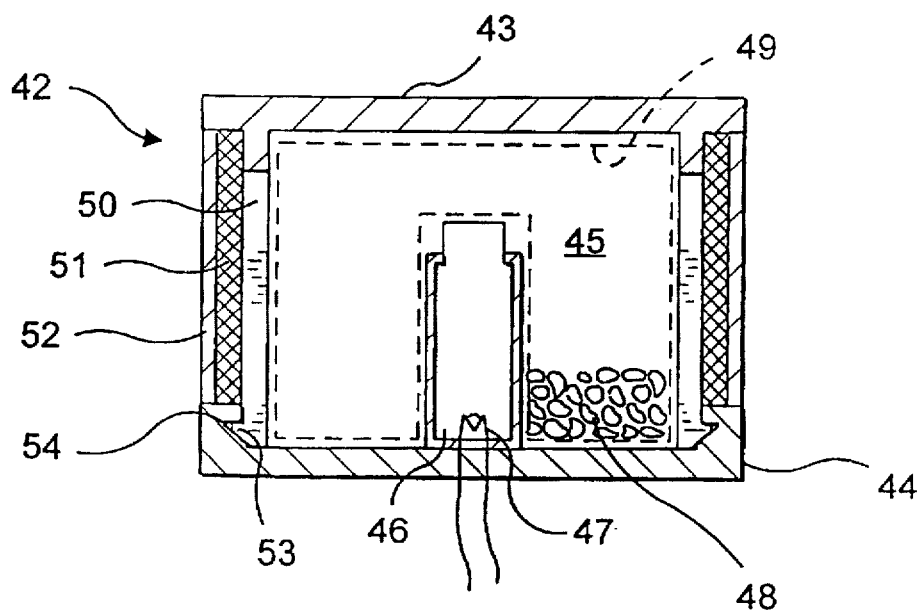
F I G. 5

5,716,072

AIRBAG GAS GENERATOR WITH SNAP JOINT CONNECTION

TECHNICAL FIELD

This invention relates to airbag gas generators for passive restraint devices and more particularly to an airbag generator which is assembled using a snap joint connection.

BACKGROUND OF THE INVENTION

Passive restraint devices which deploy during a vehicle collision are known. These devices are referred to as "airbags" because they deploy a gas filled bag to cushion impact and to limit operator or passenger contact with adjacent hard surfaces.

These devices rely on rapid gas generation for inflation after impact but before injury can occur. Most gas generators use combustible gas generating compositions which produce a large volume of non-toxic gas within a suitably short interval, on the order of about 35 milliseconds, sufficient to fully inflate the air cushion device. Typically, a solid gas generating fuel is located in a housing, and associated with means for igniting the composition in response to an impact to produce the gas that inflates the airbag.

There are two common passive restraint gas generators. One is an annular domed structure, commonly used in steering wheels, and another recently is a tubular gas generator, proposed for use in an aircraft cabin (CABS). In the CABS gas generator, a cylindrical gas generating chamber has an ignitor at one end and a gas outlet at the other end.

In either type of gas generator, there is a combustion chamber containing the solid fuel and a retention plate associated with the combustion chamber for retaining the fuel within the chamber. A gas distribution chamber is provided which allows the gas to flow to an adjacent airbag for inflation.

Various means have been considered for assembling the gas generator assembly with the important considerations being low cost, ease of assembly, and preferably, to avoid welded or threaded joints. The CABS type gas generator is typically assembled with a threaded cap. The annular type is typically welded after assembly. However, these are not ideal as welding generates heat, and threaded joints may, through friction, cause inadvertent ignition of the fuel which must be loaded within the chamber before the assembly is completed.

SUMMARY OF THE INVENTION

It is an object of the present invention to provide a gas generator for passive restraint devices which avoids welded and threaded joints, yet which allows ease of assembly and minimizes costs.

It is another object of the present invention to provide a gas generator for passive restraint devices which, though avoiding welded or threaded joints, has sufficient strength to meet the high pressure operating conditions of an airbag gas generator.

These and other objects of the present invention are achieved by an airbag gas generator for a passive restraint device which comprises a housing containing a combustion chamber, a gas generating fuel disposed within the combustion chamber, means for igniting the fuel within the combustion chamber, and gas distribution means located adjacent to the combustion chamber, the gas distribution means having a projecting lip extending from a cylindrical surface thereof, the housing having a corresponding recess within an outer end wall thereof for receiving the lip therein such that when mated the gas distribution means is locked to the housing.

Preferably, the gas distribution means has a plurality of longitudinal slots extending for substantially the length of the cylindrical surface, so as to allow inward displacement of segments defined between the slots during attachment to the housing prior to engagement of the lip to the recess for locking these parts together.

In a preferred embodiment, the lip has a first surface sloping in the direction of insertion into the housing, for easing assembly, and a second substantially flat right angle surface for locking and preventing removal of the cap from the housing.

Utilizing a snap joint, bolted or welded constructions are avoided, and the gas generating device can be readily assembled without the potential for fuel ignition.

DETAILED DESCRIPTION OF THE DRAWINGS

FIG. 4 is a cross-section of an alternative embodiment of the present invention utilizing a sleeve to reinforce the cover.

FIG. 5 is a cross-section of another alternative embodiment of the present invention.

DETAILED DESCRIPTION OF THE INVENTION

Figure 1:
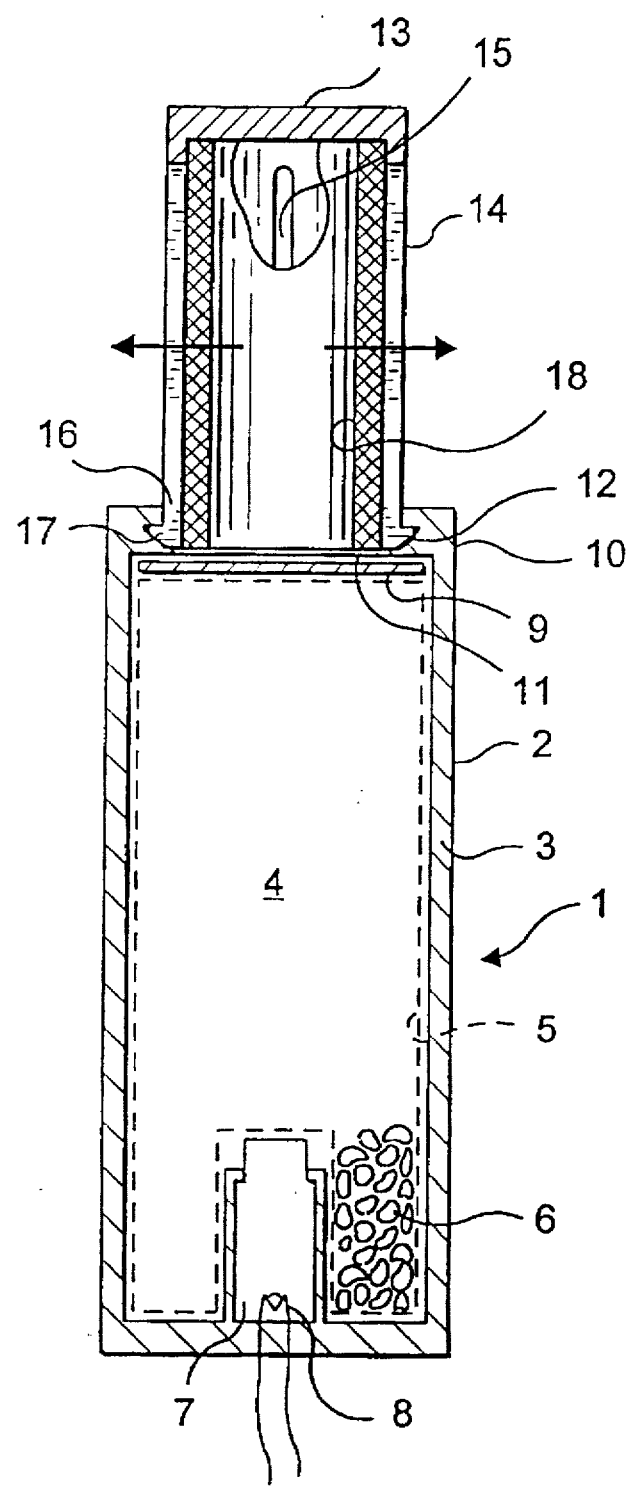
FIG. 1 is a cross-sectional view of a gas generator assembly utilizing the snap joint connection in accordance with the present invention.

Referring to FIG. 1, a gas generator assembly 1 is shown utilizing the present invention. This represents a CAB type airbag system. The gas generator assembly has a housing 2 having a tubular sidewall 3, which defines a combustion chamber 4 containing a bag 5 having a solid fuel 6 disposed therein. An ignitor 7 is connected to a squib 8 which contains an electrically ignitable compound, used to ignite the fuel. A retention screen 9, retains the fuel within the combustion chamber.

An upper end 10 of the housing includes an opening 11 having a recess 12 disposed about the circumference thereof. A gas distribution cap 13 has a cylindrical wall 14 containing exhaust slots 15. The cap has a forward end 16 having an outwardly projecting lip 17 which is engaged with the recess 12 in the opening 11. The recess and lip are shaped to effect a strong engagement between the two parts with a snap fit such that once the lip mates with the recess, the cap cannot be easily removed. A filter 18 is incorporated within the cap to remove particulates and to slow and thus cool the gas.

Figure 2:
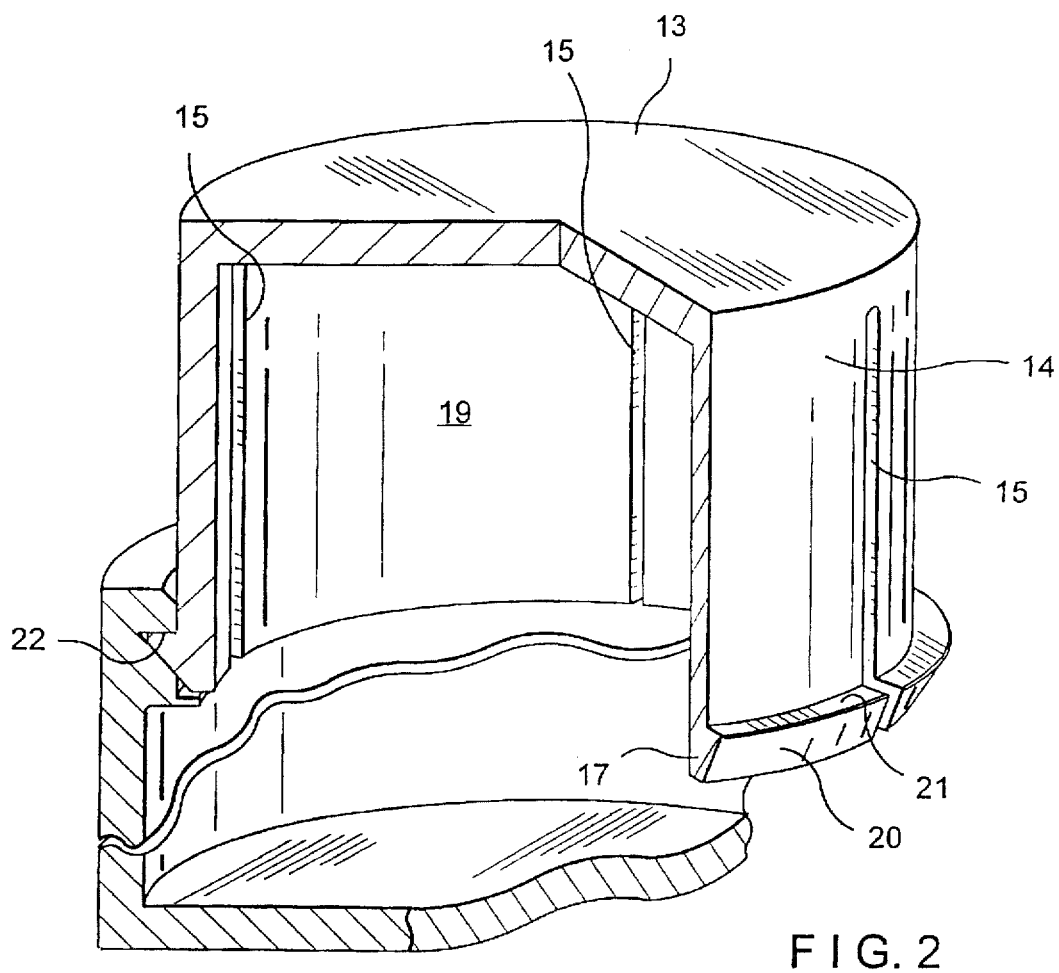
FIG. 2 is an enlarged perspective view showing the snap joint and gas distribution slots for the cap in accordance with the present invention.

Referring to FIG. 2, an enlarged perspective view of the snap joint connection is shown. In the cap 13, the exhaust slots 15 are equally spaced about the circumference, with each slot extending substantially through the longitudinal length of the cylindrical cap wall 14. The slots not only allow gas to exit from the combustion chamber, but also define segments 19 which are inwardly displaced during insertion of the cap into the opening, the amount of displacement corresponding to the outward length of the projecting lip. Generally, from four to ten slots could be used, depending on generator configuration. Slots are convenient as they not only provide flexibility, but also perform a gas distribution function.

The lip 17 has an outer surface 20 which slopes in a direction of anticipated travel of the cap when entering the housing opening, to facilitate the introduction of the cap to the opening. The lip also has a second surface 21, which is a locking surface formed approximately at a right angle to the cylindrical cap wall which is engagable with a wall 22 in the housing recess such that withdrawal of the cap from the opening is prohibited.

Figure 3:
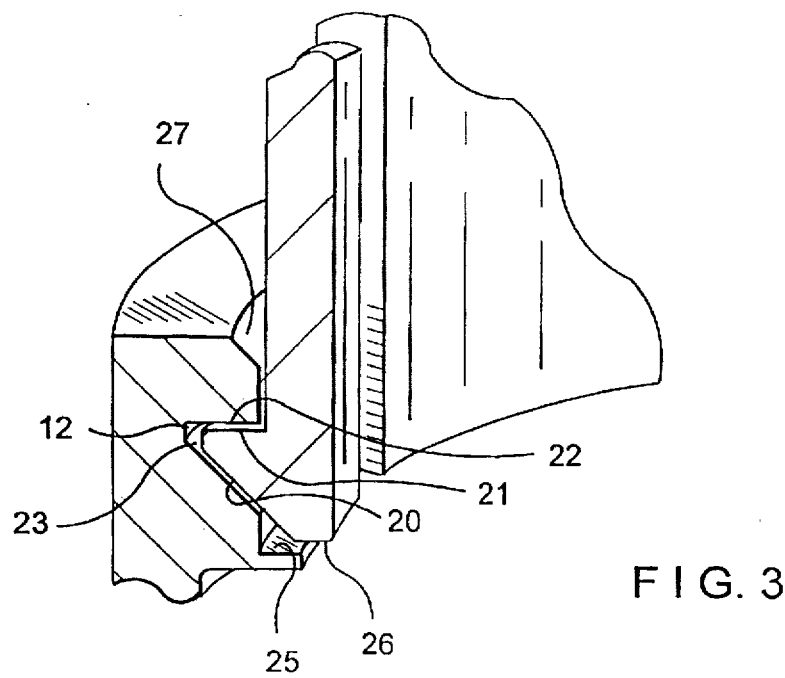
FIG. 3 is a further enlarged view of the snap joint of the invention.

Referring to FIG. 3, a further enlarged view of the snap joint is shown. The corresponding recess 12 has a sloped surface 23 complimentary to the sloped surface 20 of the cap, and the 22 which is complimentary to the locking surface 21. Additionally, there is an abutting ridge 25 at a forward end of the housing which prevents further inward travel of the cap during insertion. The abutting ridge engages a forward surface 26 of the cap. The housing also has a tapered upper surface 27 to facilitate the initiation of the inward displacement of the cap segments to facilitate insertion of the cap into the housing.

The gas generator device would be assembled according to the following steps. The housing would be provided and the ignitor and squib would be inserted in the housing. The fuel would be added to the combustion chamber, through the open end, the fuel preferably being pellets contained within a bag for ease of loading. The retention screen would then be fitted in the open end. The cap would include or have added to it the filter element, then the cap would be pressed into the open end such that the cylindrical wall of the cap, separated into segments by the slots, is displaced inwardly as the sloped surface 20 passes over the tapered surface 27 on the housing. The downward cap movement continues until the lip enters the recess 12, at which point, the natural resilience of the cylindrical wall forces the lip into the recess with a snap fit.

Since any pressurization caused by gas generation would result in an outwardly directed force, a strong attachment is achieved and maintained using the snap joint of the invention.

It is important that the segments have sufficient flexibility to deform inwardly to permit the two parts to be pressed together, without acquiring a permanent set due to plastic yielding, so as to assure that the segments do indeed snap into the recesses to form the joint. Consequently, high yield strength spring steel should be used. Preferably, fully hardened stainless steel of about 150 KSI should be used, since this component must also resist the blow off force during fuel ignition.

Referring to FIG. 4, an alternative embodiment of the present invention for an annular type gas generator is shown.

A gas generator 28 has a base 29 with an opening 30 for acceptance of a squib igniter 31 thereon. A cover 32 is attached to the base 29 by a lip 33 which projects inwardly from a cylindrical cover wall 34. The base has a corresponding recess 35 for accepting the lip thereon. Again, the lip 33 has a sloped surface 36 and a locking surface 37. The cover 32 has slots 38 for gas distribution. The cover and base define a combustion chamber 39 within which a fuel 40 is located.

Figure 3A:
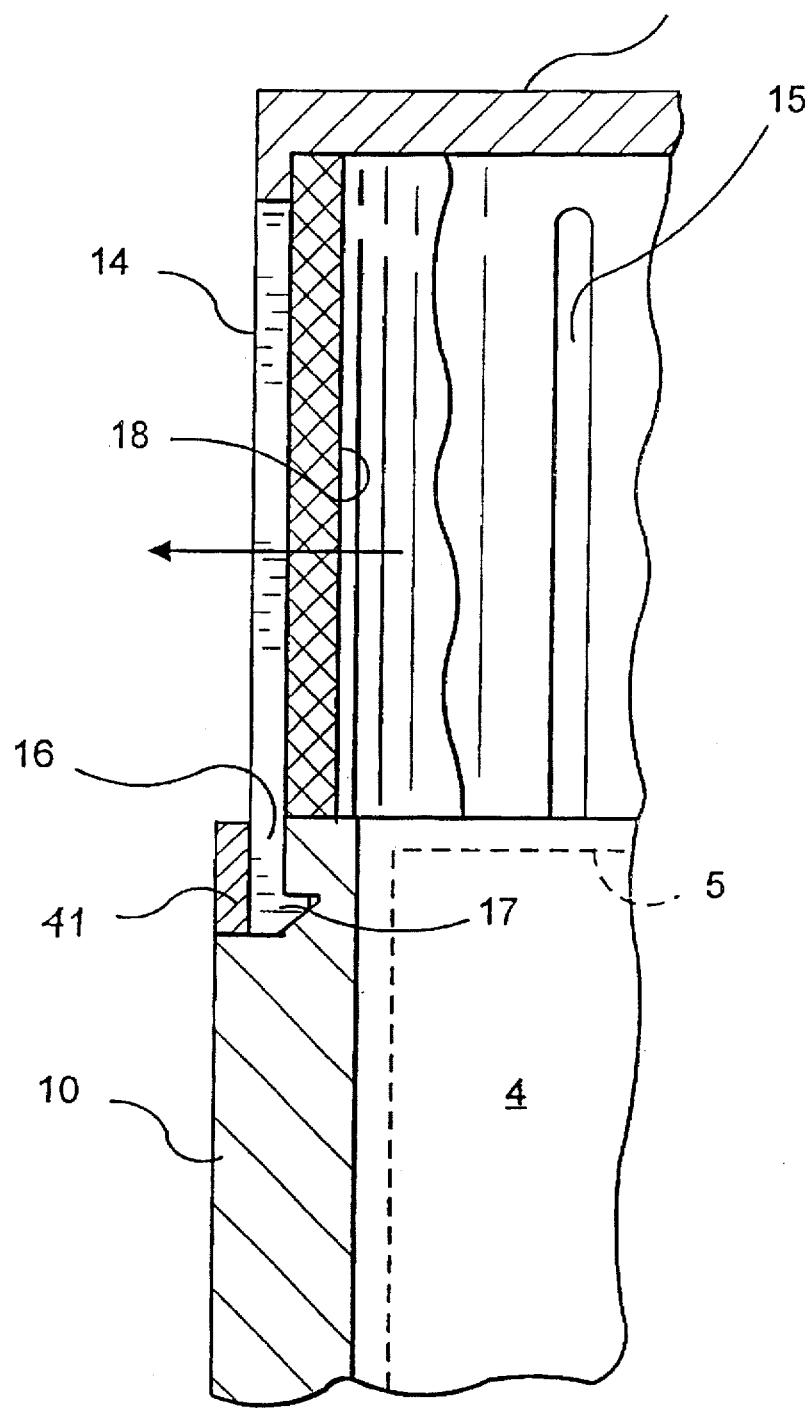
FIG. 3a is an alternative enlargement view of a snap joint of the invention.

To assure that the cover is not removed by internal pressurization, a sleeve 41 is placed over the cylindrical wall 34 so as to reinforce and thus lock the lip within the recess. This sleeve is preferably made of metal and has sufficient hoop strength to resist expansion in response to internal pressure to resist outward displacement of the cover segments, and additionally provides a ready means to disassemble the gas generator should that be necessary. FIG. 3a shows this type of snap joint with the sleeve 41 on the gas generator of the type shown in FIG. 1.

Referring to FIG. 5, another alternative embodiment of the invention is shown. In this embodiment, a gas generator 42 has a cap 43 fitted to a base 44 to define a combustion chamber 45. An ignitor 46 and a squib 47 are mounted on the base. A fuel 48 is located within a bag 49 in the space between the cap and igniter. Upon ignition of the fuel, gas generated within the chamber is distributed through slots 50, a filter 51 and a screen 52 for inflating an airbag (not shown). Here, the cap incorporates an outwardly projecting lip 53, engaged in a recess 54 in the base.

The present invention provides a load bearing structural snap joint between two structures without welding or threaded connections. The joint is able to carry external loads and also to resist the force of internal pressurization resulting from fuel ignition. Such a design permits pellets to be loaded into a gas generator after all metal forming by heating, welding, brazing, etc. has been completed, and without requiring loading pellets through the ignitor hole. The gas generator is thus easily assembled without fear of fuel ignition, and without special equipment, thus reducing costs.

While preferred embodiments of the present invention have been shown and described, it will be understood by those skilled in the art that various changes or modifications can be made not varying from the scope of the present invention.

I claim:

1. An airbag gas generator comprising a housing defining a combustion chamber and having an outlet end, solid gas generating fuel located in the combustion chamber, and gas distribution means engaged to the housing for transferring a generated gas to an inflatable restraint, the housing having a recess disposed about the outlet end, the gas distribution means having a projecting lip for mating to the recess, the gas distribution means having a plurality of longitudinal slots to distribute the gas and for defining flexible wall segments between the slots for displacement during engagement of the lip with the recess.

2. The gas generator of claim 1 wherein the lip has a first surface sloped in a direction of travel to displace the flexible wall segments during contact with the housing outlet end.

3. The gas generator of claim 1 wherein the lip has a second surface at a substantially right angle to the flexible wall segments for preventing withdrawal of the gas distribution means after the lip enters the recess, the recess having corresponding surfaces for mating therewith.

4. The gas generator of claim 1 wherein the lip projects inwardly relative to the wall segments.

5. The gas generator of claim 4 further comprising a sleeve disposed over the gas distribution means to prevent removal of the lip from the recess.

6. The gas generator of claim 1 wherein the lip projects outwardly relative to the wall segments.

7. The gas generator of claim 1 wherein the housing outlet end was a tapered surface for initiating displacement of the wall segments.

8. The gas generator of claim 1 wherein the housing has a ridge for limiting the degree of insertion of the lip into the housing during assembly.

9. A method for producing an airbag gas generator comprising:

providing a housing defining a combustion chamber and having an outlet end, the outlet end including a recess disposed about the outlet end;

providing gas distribution means having a plurality of longitudinal slots which define flexible wall segments therebetween, the gas distribution means having a projecting lip extending therefrom;

placing a solid gas generating fuel into the combustion chamber; and pressing the gas distribution means into the housing outlet end until the projecting lip engages the corresponding recess in the housing.

* * * * *